United States Patent Office 3,655,889
Patented Apr. 11, 1972

3,655,889
QUINESTROL AS A RODENT CONTROL AGENT
Robert L. Kroc, Santa Ynez, Calif., and Terrence W. Mischler, Long Valley, N.J., assignors to Warner-Lambert Company, Morris Plains, N.J.
No Drawing. Filed Dec. 9, 1969, Ser. No. 883,633
Int. Cl. A01n 9/24
U.S. Cl. 424—238                              1 Claim

ABSTRACT OF THE DISCLOSURE

The present invention discloses a novel method for the control of rodents by the administration of quinestrol.

---

The present invention relates to novel methods for the control of rodents; and more particularly, the present invention relates to novel methods whereby the propagation of rodents can be controlled by the oral administration of quinestrol.

The present invention also includes within its scope novel compositions of matter containing effective amounts of quinestrol for the control of the propagation of rodents.

The term "rodents" as used in the specification and claims includes animals such as, mice, rats, squirrels, rabbits, chipmunks, woodchucks, gophers, muskrats, nutrias, coyotes, foxes, weasels and the like.

The aforementioned rodents are a colony of animals which cause particular harm to human beings because they destroy property, livestock, crops, and more importantly, these animals are transmitters of some very serious infectious diseases. There are generally two types of methods currently available for the control or for the destruction of the rodents. The first type comprises mechanical devices, such as traps. The major disadvantages of these devices is that in order to control the rodents, many numbers of such straps must be set with a particular bait which would attract the rodent, which is obviously quite impractical when a large area is to be covered.

The second type resiles on chemical substances acting as a poison to rodents, such warfarin. While these two methods have proved effective in some areas, they are generally not satisfactory because only those rodents that are caught by the devices are killed. An important shortcoming is use of poisons in rats; death of an animal near the poisoned bait is a warning to other rats which, in fact, then avoid the bait.

The object of this invention is to provide a method whereby the population of these rodents can be effectively declined and controlled. This invention involves the injestion of a very small amount of a compound which would inhibit fertility of the rodents thereby decreasing fecundity below mortality. This would allow the rodents to "breed" themselves to a reduced level.

Another object of this invention is to provide novel methods whereby these rodents will ingest the novel compositions to be described below and will stop reproducing.

Other objects and advantages of this invention will become apparent from the following detailed description:

According to the present invention, we have found that when small amounts of quinestrol of the formula:

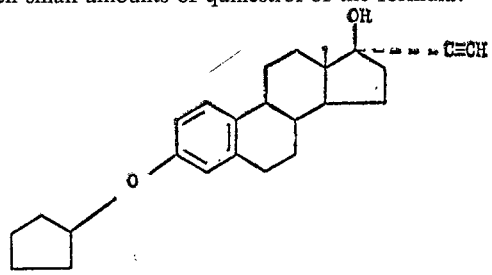

is included in the diet of the rodents, it will effectively suppress their reproduction capacity and thereby reduce the rodents from further propagation.

Broadly speaking, the practice of this invention is effected by including from at least 0.0001%, typically about 0.0001% to 0.1% of quinestrol into a bait acceptable to rodents. These baits may consist of various grains, cereals, meats, oils, seeds with or without additional sweetening agents, such as sugar.

Chemically, quinestrol is a synthetic estrogenic compound, the preparation of which is fully described in U.S. Pat. No. 3,159,543.

One important aspect of this invention resides in that fertility in both males and females will be controlled. For example, in laboratory studies, female rats taking by mouth amounts of quinestrol in the range of 0.4 to 16.0 $\mu$g. daily for 30 days were caged with male rats on the 15th day. Treated females on the high dose did not become pregnant during treatment and for 2 weeks after cessation of the drug. The treated males were not fertile on the high dose for at least 1½ months. Some of the animals were sacrificed after the experiments and it was found that ovarian weights of females were reduced along with a lack of corpora lutea. There was evidence of reduced testicular weight and inhibited spermatogenesis in males.

A further advantage of this invention involves a unique property of quinestrol. This compound has prolonged oral activity because of its storage in fat after oral administration. This advantage will require less frequent rebaiting and overcomes the problem experienced with other antifertility compounds of bait rejection due to frequent rebaiting.

Another advantage of quinestrol is its low toxicity. Laboratory studies have shown that the $LD_{50}$ of quinestrol for rats, mice, hamsters and dogs is >2 gms./kg.

A further advantage of this invention resides in the unexpected discovery that quinestrol can be given at a very low dose level as compared with other known compounds to produce the same effect.

A further advantage of using quinestrol in the above manner is that when lactating female rodents ingest the food containing quinestrol, it is secreted in very large amounts in the milk and the offspring ingesting this milk will be permanently sterilized.

Among the compositions of matter which can be used as a base are, for example, water, milk, corn, oats, wheat and other baits which are traditionally attractive to the particular rodent. Generally speaking, at least 0.0001% and typically, from about 0.0001% to 0.1% by weight is incorporated in the particular bait or rodent's diet, and calculated so that it can be ingested within one to two days.

From the above properties of quinestrol, a further illustration of this invention is the preparation of quinestrol in a diet comprising millet with 5% sugar and 0.1% quinestrol and placing this diet, in pans, in a natural feeding place for wild rats, such as an open garbage dump. The reproductive capacity of the wild rat colony at the site is determined by biweekly sampling of the population before baiting with the quinestrol-containing diet. The bait is allowed to remain at the site for 2 days. This baiting is repeated at 2 week intervals for 5 months. Bimonthly sampling of the population is continued. The consumption of the quinestrol-containing bait by rats of both sexes will result in:

(a) A reduction in number of young rats (below 150 gm.);
(b) A decrease in percentage of pregnant females;
(c) Alteration of males, with increase in numbers having testicles in abdominal rather than scrotal position;

(d) Decreased ovarian or testicular weights, with lack of corpora lutea in ovaries;
(e) Decline in population at the site, noticeable after 2 months.

We claim:
1. A method for decreasing the propagation of rats by sterilization which comprises the oral administration to said rats of an effective sterilizing amount of quinestrol.

References Cited

UNITED STATES PATENTS 3,159,954  12/1964  Ercoli _____ 424—239

OTHER REFERENCES

Meli et al., "Proc. Soc. Exptl. Biol. Med., 119:602–6 (1965).

JEROME D. GOLDBERG, Primary Examiner

V. D. TURNER, Assistant Examiner

U.S. Cl. X.R.

424—84, Dig. 12